US008530757B2

(12) United States Patent
Dinh

(10) Patent No.: US 8,530,757 B2
(45) Date of Patent: Sep. 10, 2013

(54) WATER-RESISTANT WHILE-IN-USE ELECTRICAL BOX

(75) Inventor: Cong Thanh Dinh, Collierville, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 41 days.

(21) Appl. No.: 13/365,702

(22) Filed: Feb. 3, 2012

(65) Prior Publication Data

US 2012/0222880 A1 Sep. 6, 2012

Related U.S. Application Data

(60) Provisional application No. 61/449,330, filed on Mar. 4, 2011.

(51) Int. Cl.
*H02G 3/08* (2006.01)

(52) U.S. Cl.
USPC ............... 174/481; 174/53; 174/50; 174/559; 220/3.2; 220/3.3; 220/3.8

(58) Field of Classification Search
USPC .................. 174/480, 481, 50, 53, 57, 58, 66, 174/67, 535, 559, 60, 64, 482, 484, 486, 174/490; 220/3.2–3.9, 4.02, 241, 242; 52/220.1
See application file for complete search history.

(56) References Cited

U.S. PATENT DOCUMENTS

| 904,898 | A | | 11/1908 | Russell |
|---|---|---|---|---|
| 3,835,603 | A | | 9/1974 | Schnebel |
| 3,972,579 | A | | 8/1976 | Kohaut |
| 4,071,017 | A | | 1/1978 | Russell, Jr. et al. |
| 4,078,549 | A | | 3/1978 | McKeen et al. |
| 4,233,963 | A | | 11/1980 | Werner |
| 4,315,500 | A | | 2/1982 | Gonder |
| 4,355,197 | A | | 10/1982 | Jonsson |
| 4,381,063 | A | | 4/1983 | Leong |
| 4,466,423 | A | | 8/1984 | Dolan et al. |
| 4,597,377 | A | | 7/1986 | Melamed |
| 4,654,470 | A | | 3/1987 | Feldman et al. |
| 4,656,798 | A | | 4/1987 | Hazen |
| 4,690,355 | A | | 9/1987 | Hornung et al. |
| 4,721,476 | A | * | 1/1988 | Zeliff et al. ................. 174/489 |
| 4,832,001 | A | | 5/1989 | Baer |
| 4,870,949 | A | | 10/1989 | Butler |
| 4,984,982 | A | | 1/1991 | Brownlie et al. |
| 5,122,069 | A | | 6/1992 | Brownlie et al. |

(Continued)

FOREIGN PATENT DOCUMENTS

WO 2010007193 A1 1/2010

*Primary Examiner* — Angel R Estrada

(74) *Attorney, Agent, or Firm* — Snyder, Clark, Lesch & Chung, LLP

(57) ABSTRACT

An electrical box may include a panel that is coupled to a top side of the electrical box. The panel may include a wall on one side of the panel, the wall surrounding a well, in the first panel, into a space in the electrical box. The panel may also include a cap to be placed over the wall and the well. The cap and the well may be configured to form a first bend and a second bend on a cable that extends from outside of the electrical box to an inside space of the electrical box. The first bend may include a locally lowest point on cable portions that are outside of an area under the cap.

20 Claims, 17 Drawing Sheets

(56) References Cited

U.S. PATENT DOCUMENTS

| | | | |
|---|---|---|---|
| 5,179,252 A | 1/1993 | Yang | |
| 5,310,075 A | 5/1994 | Wyler | |
| 5,342,993 A | 8/1994 | Siems | |
| 5,834,694 A | 11/1998 | Bakker et al. | |
| 5,990,414 A | 11/1999 | Posnansky | |
| 6,079,408 A | 6/2000 | Fukuda | |
| 6,102,229 A * | 8/2000 | Moncourtois | 220/3.3 |
| 6,200,155 B1 | 3/2001 | Chudkosky et al. | |
| 6,610,927 B2 | 8/2003 | Dinh et al. | |
| 6,629,619 B2 | 10/2003 | Sato et al. | |
| 6,669,041 B2 | 12/2003 | Almond | |
| 6,835,890 B2 | 12/2004 | Dinh et al. | |
| 6,848,226 B1 * | 2/2005 | Boyd et al. | 174/482 |
| 6,848,442 B2 | 2/2005 | Haber | |
| 7,105,745 B2 | 9/2006 | Drane et al. | |
| 7,276,662 B2 | 10/2007 | Drane | |
| 7,285,719 B2 | 10/2007 | Conger | |
| 7,301,100 B2 | 11/2007 | Drane et al. | |
| 7,476,806 B2 * | 1/2009 | Dinh | 174/58 |
| 7,574,842 B2 | 8/2009 | Russell | |
| D605,585 S | 12/2009 | Conger | |
| 7,687,706 B2 | 3/2010 | Conger | |
| D625,250 S | 10/2010 | Conger | |
| 7,989,711 B2 * | 8/2011 | Jolly | 174/482 |
| 8,013,242 B1 * | 9/2011 | Thibault et al. | 174/53 |
| 8,119,912 B2 * | 2/2012 | Thibault et al. | 174/67 |
| 2005/0035244 A1 | 2/2005 | Conger | |
| 2008/0061193 A1 | 3/2008 | Conger | |
| 2008/0168981 A1 | 7/2008 | Cummings et al. | |
| 2008/0283112 A1 | 11/2008 | Conger | |
| 2008/0283113 A1 | 11/2008 | Conger | |
| 2009/0038672 A1 | 2/2009 | Conger | |
| 2010/0000516 A1 | 1/2010 | Conger | |

* cited by examiner

US 8,530,757 B2

WATER-RESISTANT WHILE-IN-USE ELECTRICAL BOX

RELATED APPLICATION

This application claims priority under 35 U.S.C. §119 based on U.S. Provisional Patent Application No. 61/449,330 filed Mar. 4, 2011, the disclosure of which is incorporated by reference herein in its entirety.

BACKGROUND INFORMATION

Electrical boxes are often mounted vertically in walls prior to completion of the wall structure to provide a housing for electrical devices and wiring that may be used for telephone, video, and networking, among other utility and communication uses. For example, an electrical box may be mounted on a wall stud prior to drywall installation, thus providing an electrical housing within the wall for the termination of electrical cable and the connection of the cable wiring to a mounted electrical outlet.

In potentially wet environments, electrical boxes are often mounted vertically to a wall or other structure to supply electricity. Some traditional installations may provide a box that houses an electrical outlet mounted to the vertical surface of an exterior wall. A cover may be provided over outdoor electrical outlet receptacles to help protect the outlet from moisture and other environmental conditions. The cover allows access to the outlet receptacles in order to plug in a male electrical fitting of an electrical cord or device into a receptacle. In some installations the electrical box may be mounted within the exterior wall and a cover provided over the outlet receptacles.

DETAILED DESCRIPTION OF PREFERRED EMBODIMENTS

The following detailed description refers to the accompanying drawings. The same reference numbers in different drawings may identify the same or similar elements.

As described herein, an electrical box may be conveniently installed in or on structures (e.g., floor, wall, beams, etc.) in an indoor or outdoor environment. The electrical box may be installed on structures (e.g., floor) and be arranged in one of two configurations. In one configuration, one side of a cover panel of the electrical box may be placed on the top of the electrical box, such that the top surface of the electrical box and the surface of the structure form a relatively flat plane. This may allow, for example, a user to mop over the plane. In another configuration, the other side of the cover panel of the electrical box may be placed on the top of the electrical box. In this configuration, the cover panel provides for cables, cord, or electrical wires to be connected to devices inside the electrical box via an opening.

As described below, the exemplary configurations may prevent water, which may originate from outside of the electrical box, from migrating into and through the electrical box to the devices/components and wiring mounted therein. Implementations described herein may also provide an electrical box that accommodates an electrical fitting, such as a male two or three-pronged plug, as well as cable or cord extending from the electrical fitting to areas external to the electrical box. This may allow for electrical connection from the devices/components to the exterior of the electrical box, while protecting the enclosed devices/components and the electrical connection extending from the devices/components.

Figure 1:
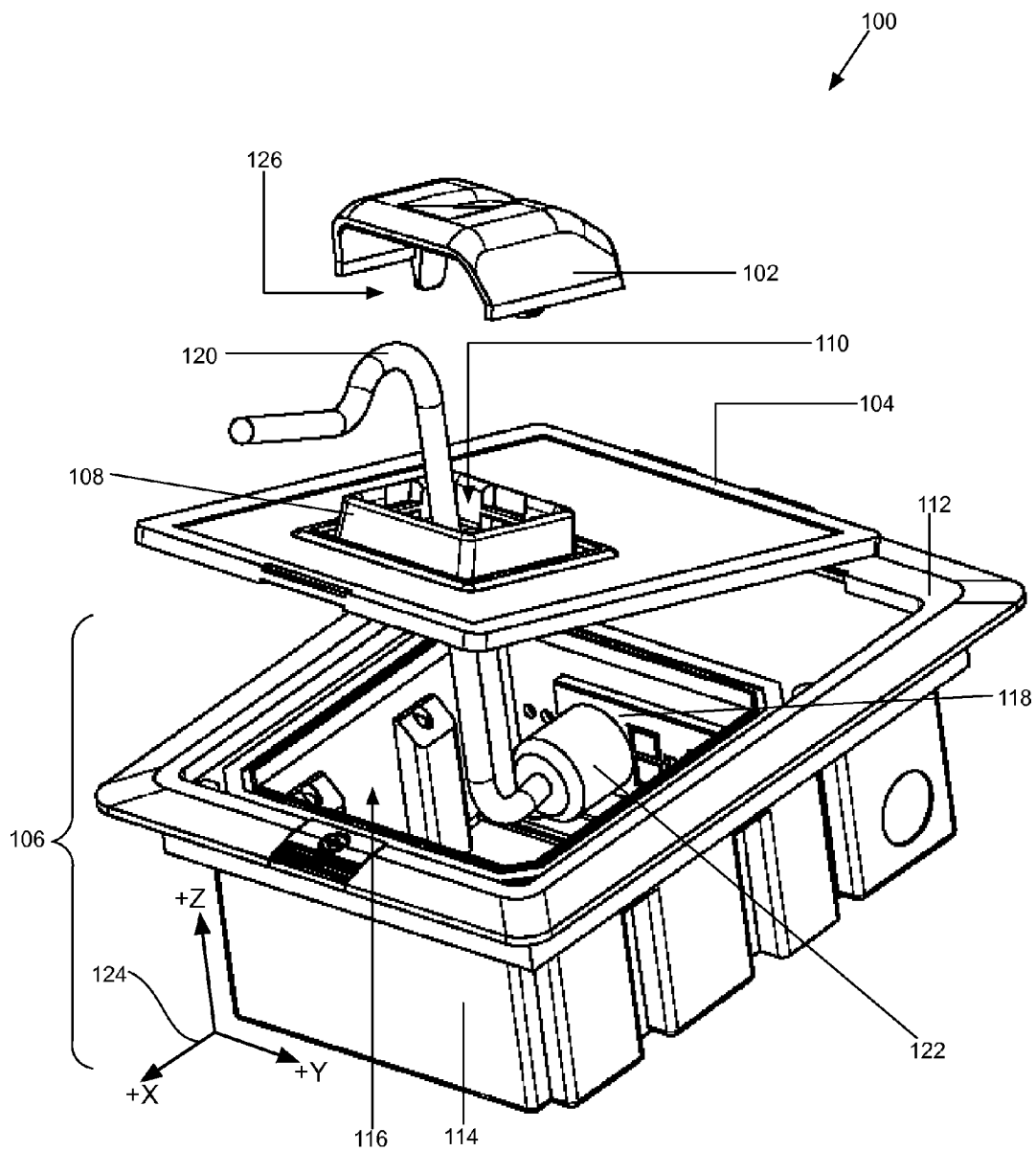
FIG. 1 illustrates concepts that are described herein.

FIG. 1 illustrates concepts that are described herein. FIG. 1 shows an exemplary electrical box 100 in a partially assembled configuration. Electrical box 100 may be associated with one or more electrical functions (e.g. a switch box, a gang box, an outlet box, etc.) and may provide an enclosure for one or more devices and/or components described herein. The devices or components may be electrical devices/components and have associated wiring, wireless connections or circuitry. The devices/components may also have one or more applications for electrical power supply, telephone, video, or networking, among other utility and communication uses.

In the following, different orientations or directions are referred to with respect to a xyz-axis 124. As used herein, a direction toward the front of electrical box 100 is in the direction of +x axis, a direction toward the top is in +z direction, and the direction toward "front side" is in +y direction.

As shown, electrical box 100 includes a shielding cap 102, a cover panel 104, and housing 106. Shielding cap 102, when attached to cover panel 104, provides a protective cover to an opening 110 into electrical box 100. Cover panel 104 covers the top of housing 106. Cover panel 104 includes opening 110 and well wall 108. Through opening 110, an electrical cable/cord 120 may pass through from the exterior of electrical box 100 into an interior volume of housing 106. Well wall 108 is perpendicularly attached to or integrally formed upon one surface of cover panel 104 and surrounds opening 110. Well wall 108 may serve as a protective barrier against elements and/or other materials (e.g., water, cleaning agent, snow, rain, sleet, dirt, leaves, trash, etc.). In addition, as described below in greater detail, well wall 108 may operate together with shielding cap 102, when electrical box 100 is assembled for use, in placing a bend on a particular portion of electrical cord or cable 120 that runs from the exterior of electrical box 100 into the enclosed volume therein.

Housing 106 may include a frame panel 112 and body 114. Frame panel 112 provides a frame into which cover panel 104 may be placed or fitted. Frame panel 112 includes an opening 116 through which ingress electrical plug 122 (which also passes through opening 110 in cover panel 104) may pass, into the space within body 114. Body 114 may enclose electrical devices or components, such as for example, electrical receptacle/outlet 118, communication devices, switches, etc. In FIG. 1, inside the space in body 114, electrical plug/connector/adaptor 122 is illustrated as inserted into receptacle/outlet 118. Shielding cap 102, cover panel 104, and housing 106 may be made of plastic, molded metal, etc.

To assemble electrical box 100, after adaptor 122 is inserted into receptacle 118, shielding cap 102 may be placed over well wall 108 of cover panel 104, thus roofing opening 110. Furthermore, cover panel 104 may be fitted into frame panel 112. When assembled, shielding cap 102 and well wall 108 protect electrical box 100 from external materials or elements. Because opening 110 is protected by shielding cap 102 in this configuration, the elements may not enter electric box 100, except through an open side 126. On open side 126, however, well wall 108 operates as a barrier against external elements from entering electrical box 100.

FIG. 1 provides an overview of electrical box 100 and its one exemplary use. Accordingly, FIG. 1 does not show some components of electrical box 100. Furthermore, in the above, some components shown in FIG. 1 are not fully described for simplicity. In the following description, electrical box 100, different implementations of electrical box 100, their components, and their uses are described in greater detail with reference to FIGS. 2 through 17.

Figure 2:
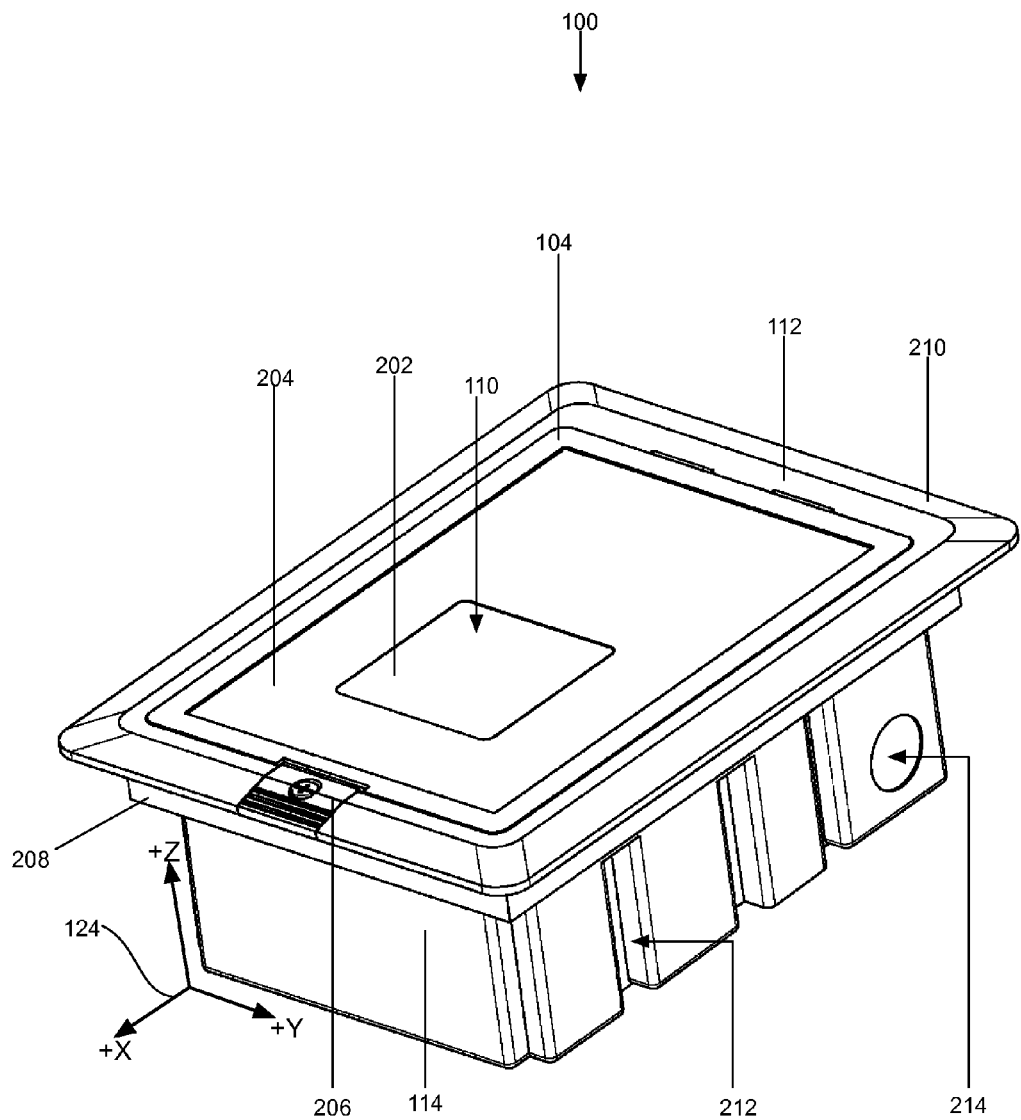
FIG. 2 illustrates a front top isometric view of an exemplary electrical box in one configuration.

FIG. 2 illustrates a front top isometric view of electrical box 100 in a second configuration. In the configuration, as shown in FIG. 2, cover panel 104 of FIG. 1, which is reversible, is flipped over and fitted into frame panel 112.

As shown, cover panel 104 includes a sealing door 202 and bottom surface 204. Bottom surface 204 is the flipside of cover panel 104's surface illustrated in FIG. 1. Bottom surface 204 includes opening 110 (also shown in FIG. 1), into which sealing door 202, in the shape of rectangle, square, or any geometrical shape, is fitted. In the configuration shown in FIG. 2, sealing door 202 may keep elements out of electrical box 100.

Frame panel 112 includes a flap 206, flange 210, and frame walls 208. Flap 206 (e.g., a flat piece of material) may fit into a recessed area in frame panel 112. When placed in the recess, flap 206 overlaps a portion of cover panel 104. In one implementation, a screw through flap 206 and frame panel 112 may be tightened to couple one end of cover panel 104 to frame panel 112.

Flange or rim 210 may extend outwardly or laterally from a top of frame panel 112. Frame walls 208, which surround body 114 of housing 106, extend perpendicularly and downwardly from the bottom surface of flange/rim 210. Both flange/rim 210 and frame walls 208 may provide additional rigidity and strength to frame panel 112.

In some implementations, flange 210 and frame walls 208 may cooperate in a combination to facilitate the installation of electrical box 100. For example, to mount electrical box 100 in a floor, a hole having the dimensions of frame walls 208 may be made in the floor. Electrical box 100 may be dropped therein. Flange 210 may hold electrical box from falling through the hole by abutting against the floor surface.

Body 114 may include five sides/walls that form an enclosure, including four side walls and a bottom. Front and back sidewalls of body 114 may include grooves 212 that spans vertically, in z-direction on xyz-axis 124. Each groove provides a room for an attachment screw that may span from a point on the groove to a structure (e.g., wall surface, beam, etc.) to which the screw affixes electrical box 100. Knockouts 214 provide openings through which electrical cables, cords, wirings, and/or other components from devices within electrical box 100 may be received. In some implementations, body 114 may also include slots or holes throughout its surfaces (e.g., front, side, and bottom walls). These holes may allow water to escape from body 114, preventing the fluid from collecting and damaging electrical devices/components inside body 114.

Figure 3:
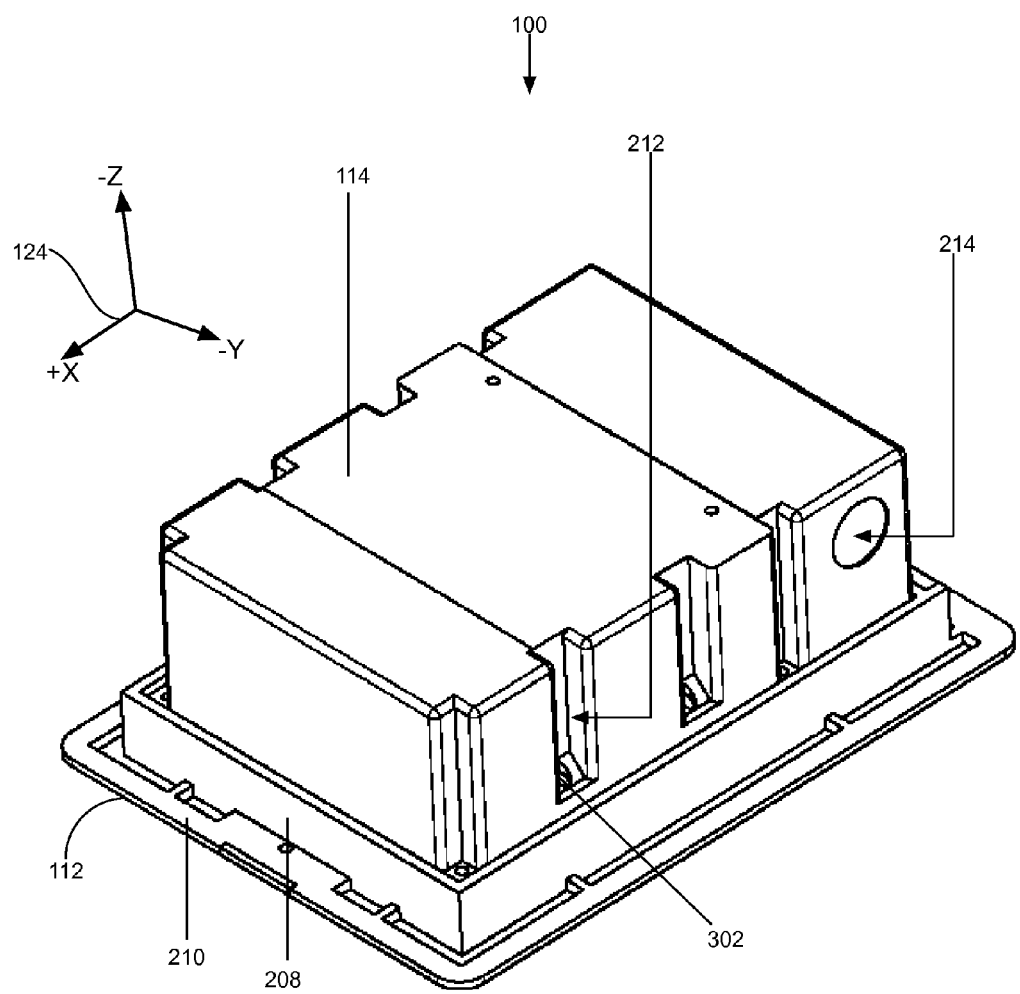
FIG. 3 is a front bottom isometric view of the electrical box of FIG. 2.

FIG. 3 is a front bottom isometric view of electrical box 100. A shown, each groove 212 includes hole 302 from which a screw for groove 212 may protrude from within electrical box 100. The screw may be directed, for example, vertically in −z direction of xyz-axes 124, or at an angle relative to the −z-direction. Each groove 212 may accommodate these different directions.

FIG. 3 also shows the spatial relationship between frame walls 208 and flange/rim 210. As discussed above, frame walls 208 stand perpendicularly to frame panel 112, and flange 210 extends outwardly and/or laterally from frame panel 112.

Figure 4:
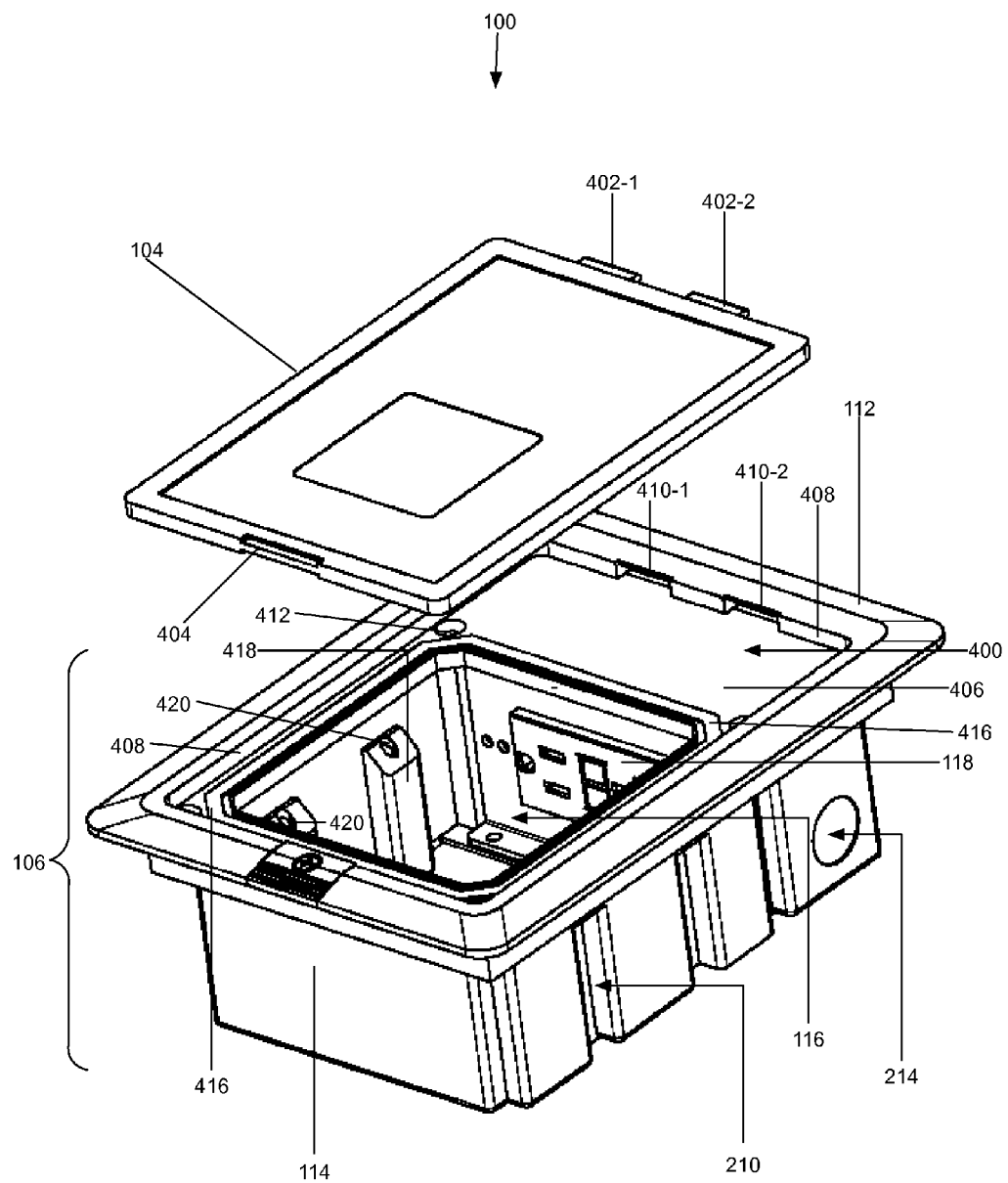
FIG. 4 is a front top isometric view of the electrical box of FIG. 2, with the cover panel separated from the electrical box.

FIG. 4 is a front top isometric view of electrical box 100. In contrast to FIG. 2, FIG. 4 shows cover panel 104 separated from housing 106. FIG. 4 reveals a number of components not shown in FIG. 2. For example, FIG. 4 shows cover panel 104 as including tabs 402-1 and 402-2 and a notched portion 404. On cover panel 104, tabs 402-1 and 402-2 may project rearwardly from the back edge of cover panel 104. Notched portion 404 may be provided on the front edge of cover panel 104, formed by recesses in the front edge. In another example, FIG. 4 shows frame panel 112 as having a recessed surface 406, circumscribed by an inner rim surface 408. Recessed surface 406 may be sized to receive cover panel 104 therein. Panel space 400 is shown as the space just above recessed surface 406 and partially surrounded by recessed surface 406 and rim surface 408.

To assemble cover panel 104 and frame panel 112 into the configuration illustrated in FIG. 2, tabs 402-1 and 402-2 may be inserted into slots 410-1 and 410-2 provided in rim surface 408. Cover panel 104 may be fitted into panel space 400 (with flap 206 temporarily removed). Once cover panel 104 occupies panel space 400, flap 206 may be placed in its original orientation, partially covering notched portion 404. The screw on flap 206 may then be tightened, to securely couple cover panel 104 to frame panel 112.

In one embodiment, frame panel 112 may include a gasket 416, placed around opening 116 and one or more screw holes 412, as shown in FIG. 4. When cover panel 104 is locked in frame panel 112, gasket 416 may form a water/moisture-proof seal. Screw holes 412 may be positioned such that screws inserted therein may couple frame panel 112 to body 114.

As shown through opening 116, body 114 may include electrical outlet 118, protrusions 418, and screw holes 420. Electrical outlet 118 may provide an electrical receptacle (e.g., 3-pronged or 2-pronged) into which electrical plug, connector, or adaptor may be attached. Protrusions 418 may include a shape that intrudes from the inside surface of body 114 into the space of body 114. Each of protrusion 418 corresponds to one of grooves 210 on the exterior surface of body 114. Screw holes 420 (only 2 of which are shown in FIG.

4) provides an opening through which the body of a screw (e.g., the portion excluding the head of the screw) from within body 114 may pass to the outside of electrical box 100. As described above, the screw may hold electrical box 100 to an external structure into which the end extruding from box 100 may be inserted.

Figure 5:
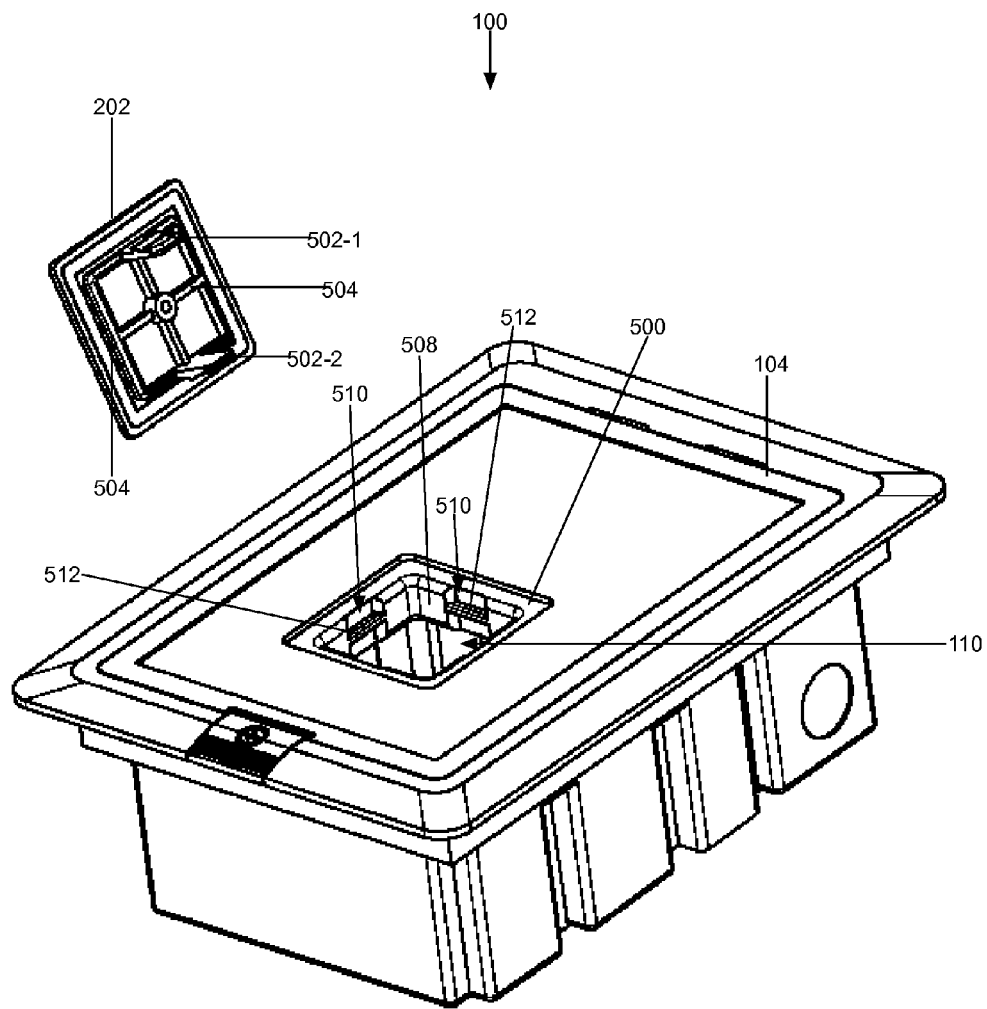
FIG. 5 is a front top isometric view of the electrical box of FIG. 1, with the sealing door separated from the cover panel.

FIG. 5 is a front top isometric view of electrical box 100, with sealing door 202 separated from cover panel 104. FIG. 5 illustrates sealing door 202 and opening 110 in bottom surface 204 of cover panel 104 in greater detail. As shown, sealing door 202 may include fins 502-1 and 502-2 and ribs 504 projecting from its bottom surface. Fins 502-1 and 502-2 may engage cover panel 104 when sealing door 202 is fitted into opening 110 to hold sealing door 202 in place. Ribs 504 may support sealing door 202 against forces that are normal to the surface of sealing door 202 and provide for additional rigidity to sealing door 202.

As also shown, opening 110 on cover panel 104 leads downwardly to a support edge surface 500 around a narrower channel formed by surrounding walls 508 extending in −z direction. When sealing door 202 is placed in opening 110, sealing door 202 is prevented from falling therethrough by support edge surface 500. In FIG. 5, walls 508 have four sides, each of which includes a vertical slot 510. Each slot 520 may receive a fin 502-1 or 502-2, depending on the orientation of sealing door 202 when sealing door 202 is fitted in opening 110.

Each slot 520 includes a horizontal bar 512. When fins 502-1 and 502-2 are inserted into slots 520, a bump/feature (see item 606-2 in FIG. 6) on an external surface of each fin 502-1 and 502-2 may engage or interlock bar 512 in slot 510. The interlocking/engagement of fins 502 and bar 512 holds sealing door 202 in place. Once sealing door 202 is locked, sealing door 202 may be released by removing cover panel 104 from frame panel 112 and pressing on the tip of fins 502-2 protruding from the other side of cover panel 104. Depending on the implementation, in place of fins 502, slots 510, and bars 512, other mechanisms may be used to "snap" sealing door 202 in opening 110.

Figure 6:
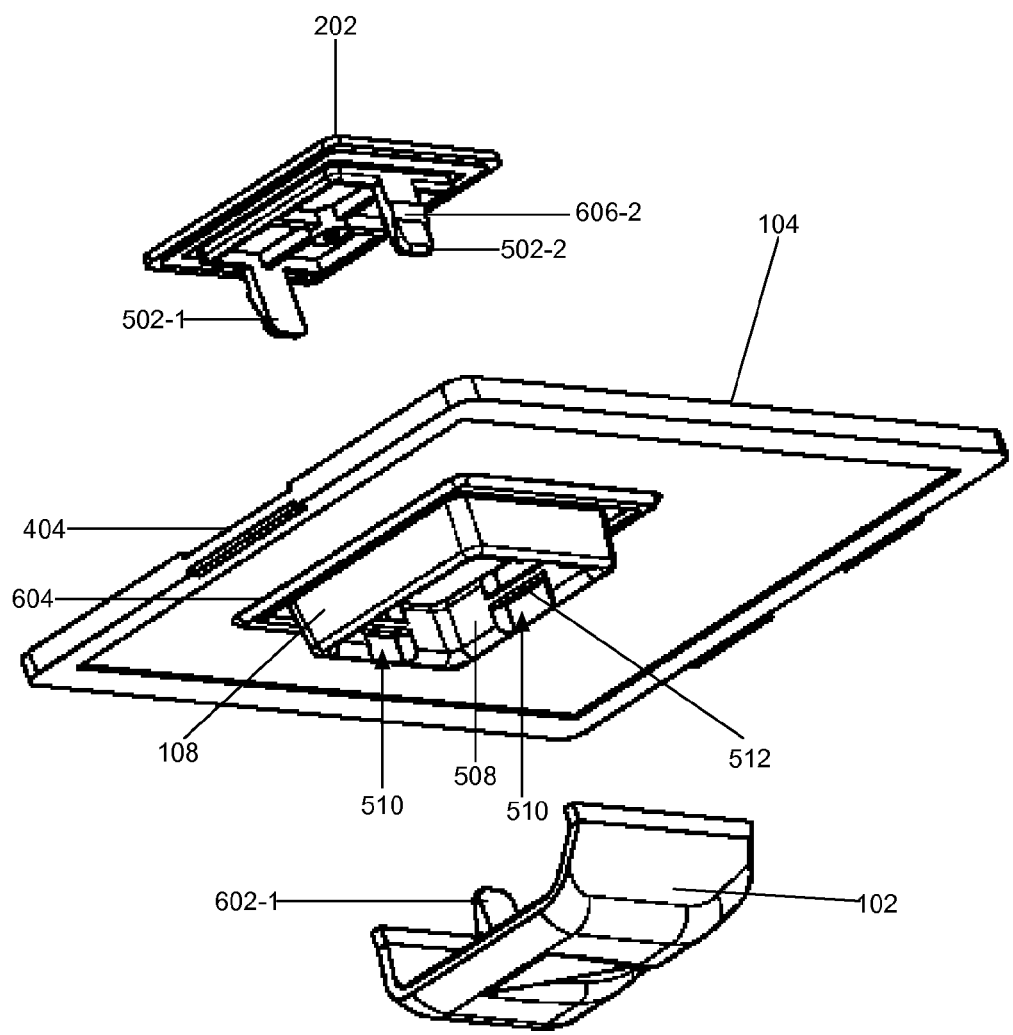
FIG. 6 is a bottom isometric view of the shielding cap and cover panel of FIG. 2 and the sealing door of FIG. 5.

FIG. 6 is a bottom isometric view of sealing door 202, cover panel 104, and shielding cap 102. FIG. 6 illustrates bump/feature 606-2 that may engage bar 512 in slot 510. In addition, FIG. 6 shows that wall 508 is the reverse side of well wall 108 described above. Furthermore, FIG. 6 shows shielding cap 102 having fin 602-1. Shielding cap 102 may also include fin 602-2, but this is not shown in FIG. 6. Fin 602-1 or fin 602-2 may be engaged in slot 510 in the absence of fin 502-1 or fin 502-2 in slot 510.

In some implementations, when sealing door 202 is placed on opening 110, shielding cap 102 is prevented from being engaged to wall 508 (e.g., fins 602-1 and 602-2 are pushed out from slots 510 by fins 502-1 and 502-2 pushing from the other side of cover panel 104). Conversely, when shielding cap 102 is attached to cover panel 104 via fins 602-1 and 602-2 (not shown), sealing door 202 is prevented from being engaged with wall 508. In one implementation, the underside (i.e., the visible side in FIG. 6) of sealing door 202 may be attached to the underside (i.e., the occluded side) of shielding cap 102 by a cord (e.g., a plastic cord, band, spring, etc.) through opening 110. Such an arrangement may prevent sealing door 202 or shielding cap 102 from being lost when either sealing door 202 or shielding cap 102 is attached to cover panel 104. Depending on the implementation, other mechanisms may be used for the same purpose (e.g., attaching sealing door 202 and/or shielding cap 102 to cover panel 104 via a string, cord, a hinge, etc. to prevent sealing door 202 or shielding cap 102 from being misplaced or lost).

Figure 7:
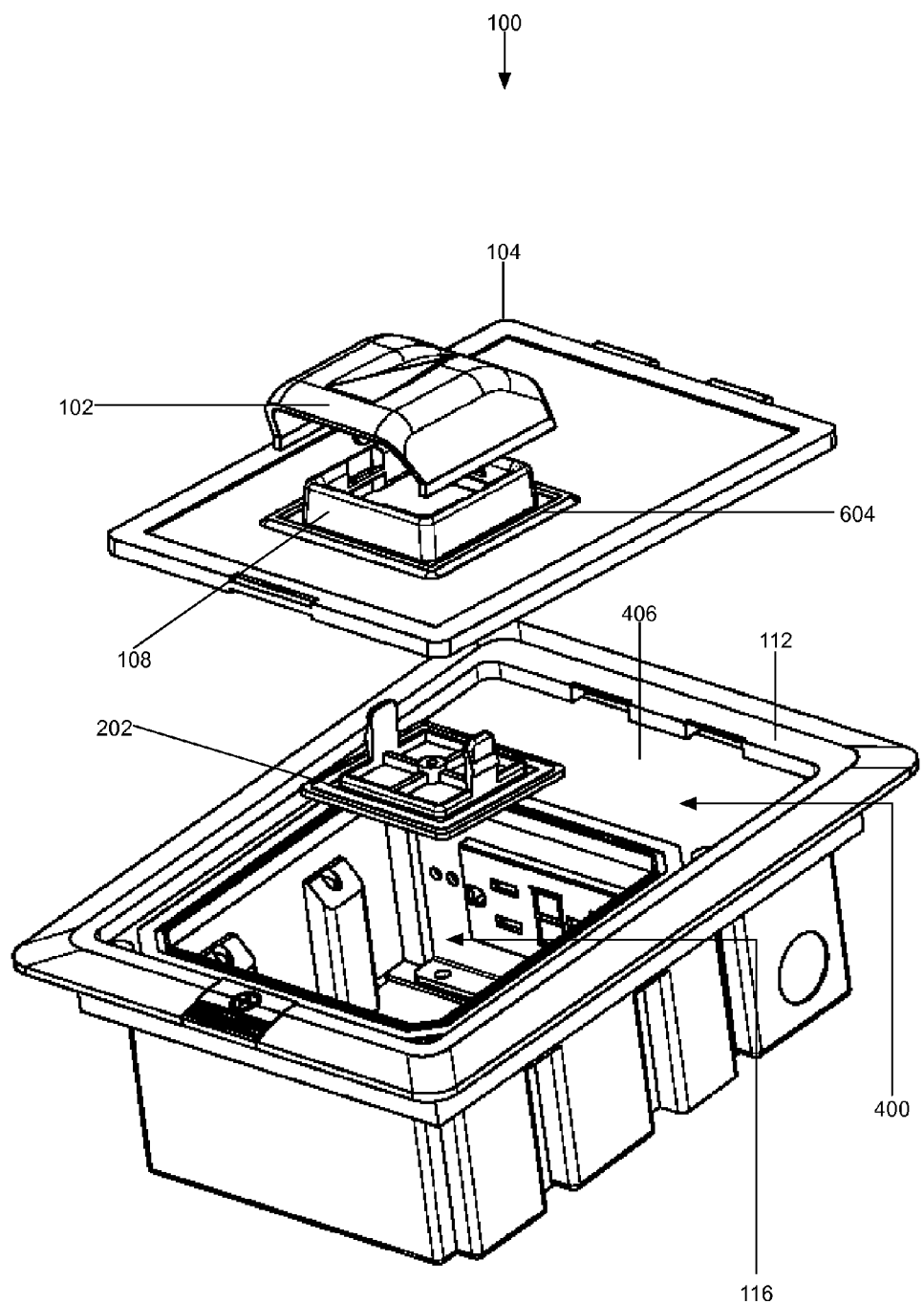
FIG. 7 is a front top isometric view of the shielding cap, cover panel, sealing door, and housing of the electrical box of FIG. 2 in a second configuration.

FIG. 7 is a front top isometric view of shielding cap 102, cover panel 104, sealing door 202, and housing 106 of electrical box 100 in an unassembled configuration. Shielding cap 102 and cover panel 104 in FIG. 7 are, in relation to the corresponding elements in FIG. 4, upside down. In FIG. 4, shielding cap 102 is inside electrical box 100 and, thus, hidden from view. In contrast, FIG. 7 shows shielding cap 102.

Figure 8:
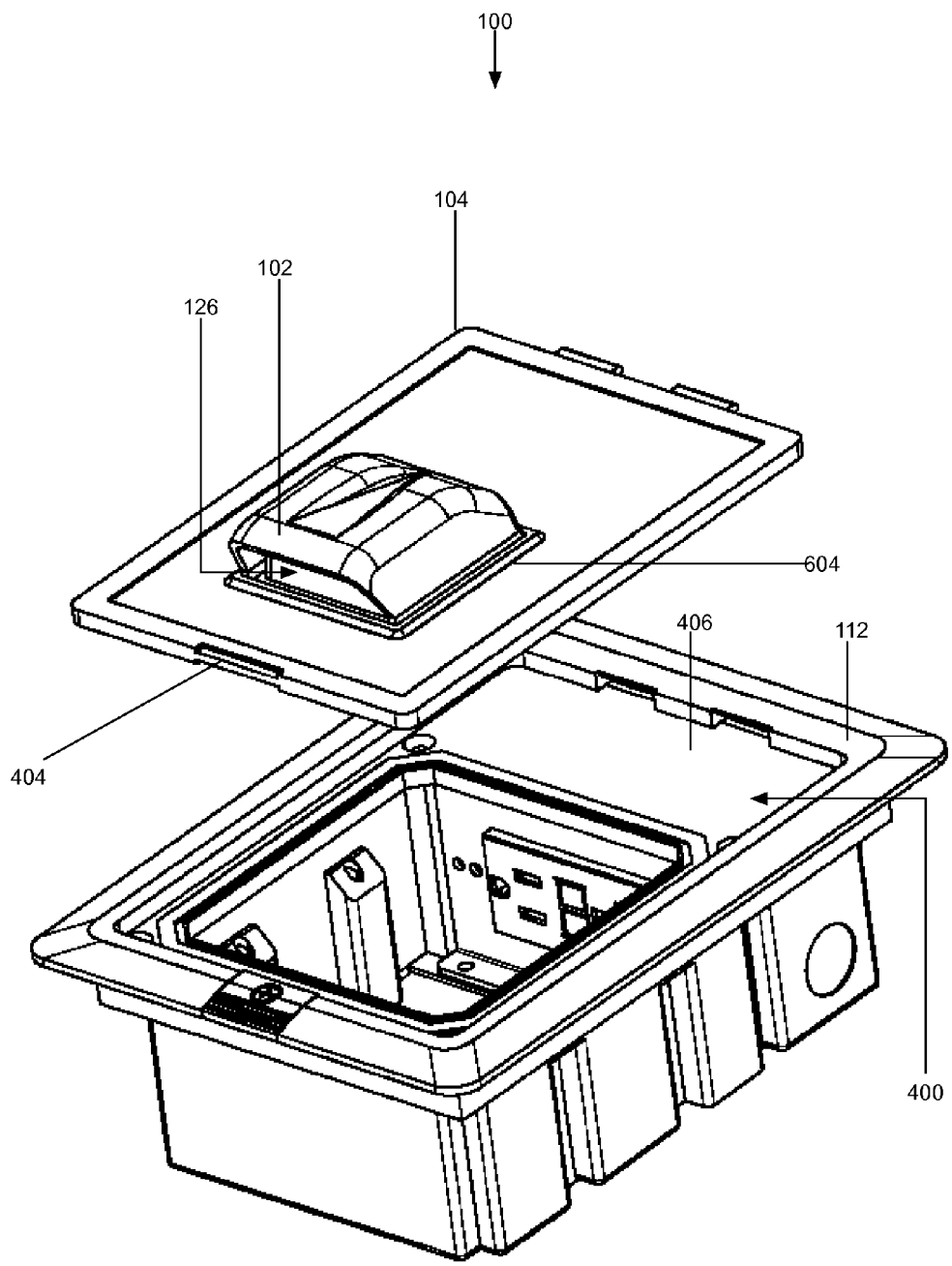
FIG. 8 is a front top isometric view of the electrical box of FIG. 2, with the shielding cap and the cover panel assembled.

Once electrical wirings are in appropriate positions and screws affix electrical box 100 to an external structure, electrical box 100 may be assembled for use, by placing shielding cap 102 onto cover panel 104 and fitting cover panel 112 in panel space 400 (with bottom surface 204 is facing outward). FIG. 8 shows a configuration of electrical box 100 in which shielding cap 102, cover panel 104, and housing 106 are assembled. As described above, in a different configuration, cover panel 104 may be fitted into panel space 400 with bottom surface 204 abutting recessed surface 406. In this configuration, sealing door 202 is on the external surface of electrical box 100.

Figure 9:
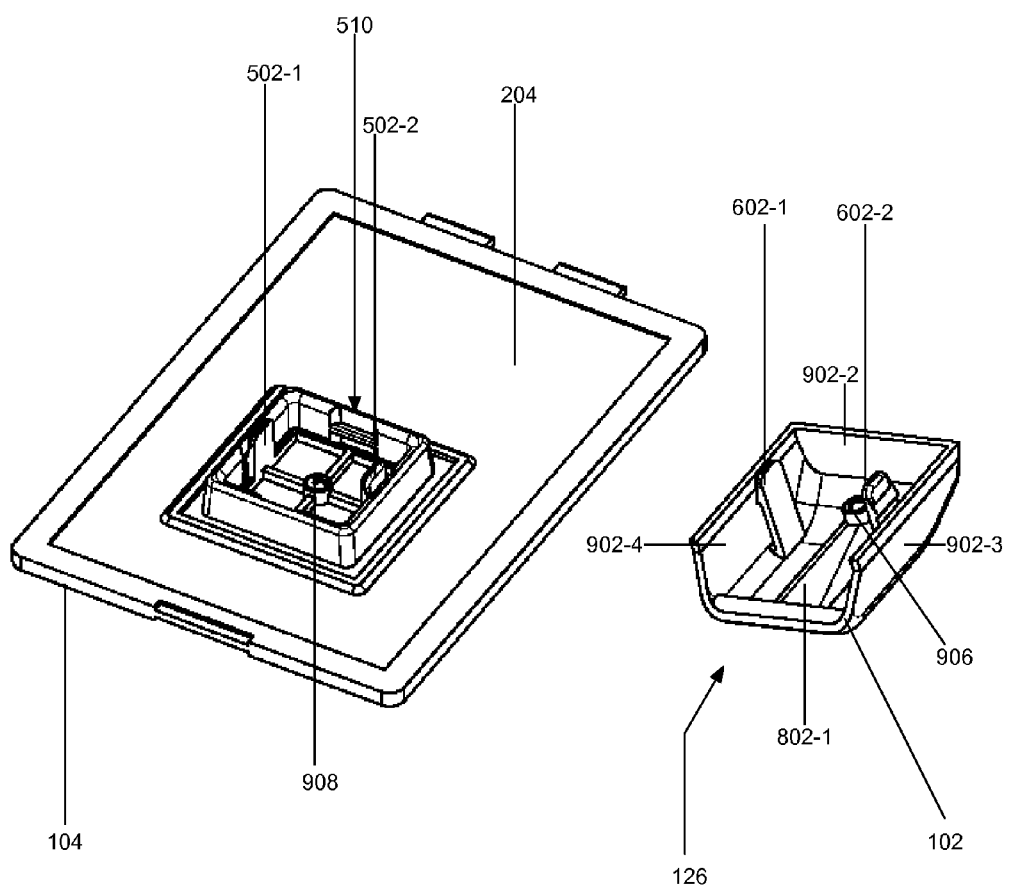
FIG. 9 is a bottom isometric view of the cover panel of the electrical box of FIG. 2 and the shielding cap of FIG. 7.

FIG. 9 is a front top isometric view of cover panel 104 and sealing door 202 in an assembled configuration. As shown, when sealing door 202 and cover panel 104 are assembled, fins 502-1 and 502-2 engage slots 510 of walls 508.

In addition, FIG. 9 shows a bottom isometric view of shielding cap 102. In FIG. 9, both fins 602-1 and 602-2 attached to the underside of shielding cap 102 are clearly visible. As shown, shielding cap 102 has only three sides 902-2, 902-3, and 902-4. Open side 126 provides for an opening through which an electrical wiring, cable, or cord may enter/exit into/from electrical box 100, as illustrated in FIG. 1. Attachment point 906 may be used to connect to one end of a cord, rubber band, wiring, etc. The other end of the cord, band, etc., may pass through opening 110 and be connected to an attachment point 908 on sealing door 202, to effectively couple shielding cap 102 to sealing door 202.

Figure 10:
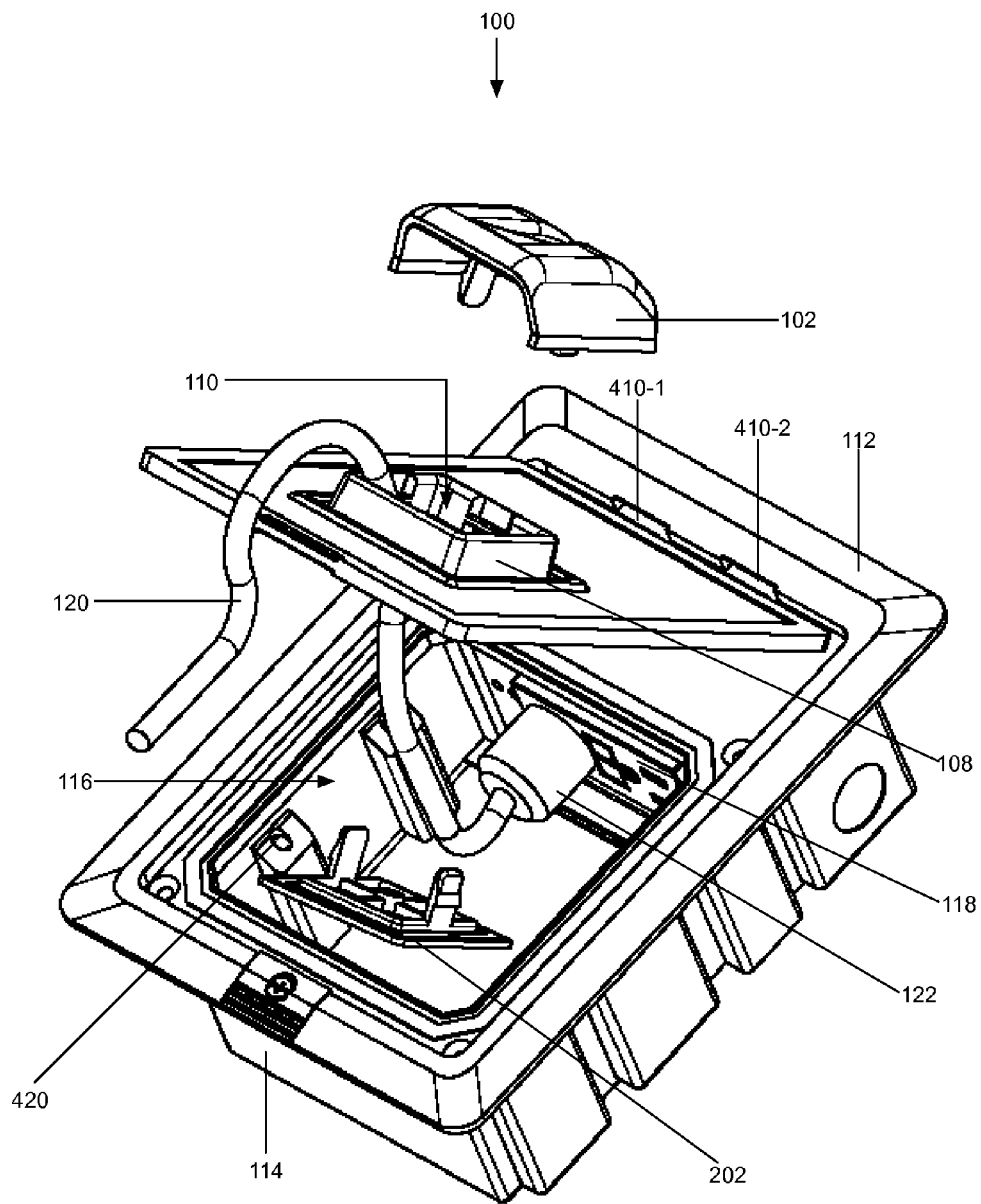
FIG. 10 is a partially exploded front top isometric view of the electrical box of FIG. 2 configured for use.

FIG. 10 is a front top isometric view of electrical box 100 being configured for use. To assemble electrical box 100 for use, shielding cap 102 may be detached as shown in FIG. 10 (if it is not already detached from cover panel 104) and cord/cable 120 may be run through opening 110 in cover panel 104 and through opening 116 in frame panel 112, into the space in body 114 of housing 106. In running cord/cable 120 through openings 110 and 116, sealing door 202, which may have been blocking opening 110, may be removed or popped off.

Figure 11:
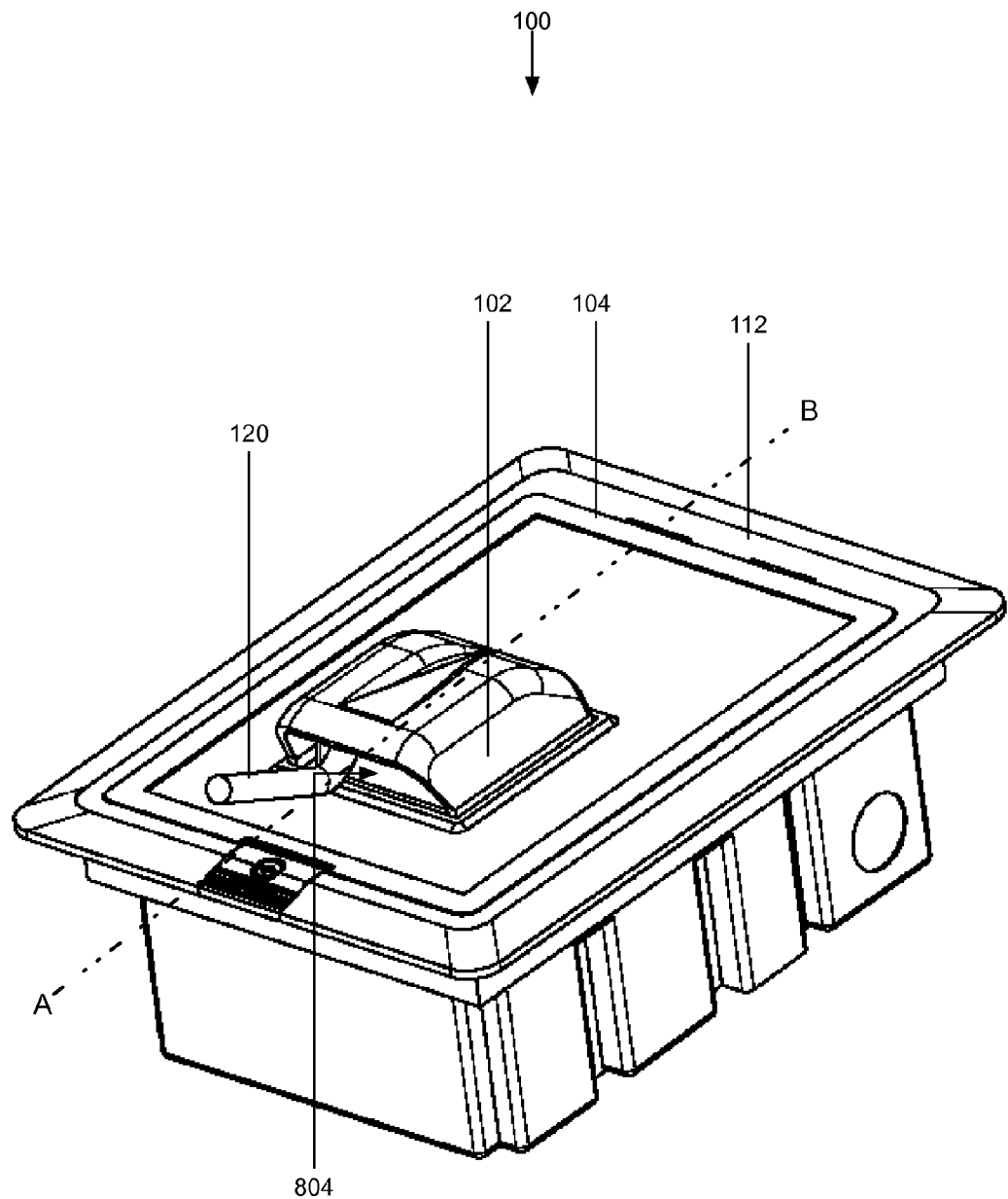
FIG. 11 is an assembled front top isometric view of the electrical box of FIG. 10.

Lifting cover panel 104, fully or partially as shown, plug 122 at proximal end of cord/cable 120 may be fitted or plugged into receptacle/outlet 118. Thereafter, shielding cap 102 may be placed or attached to cover panel 104, and cover panel 104 may be fitted into panel spacing 400. Flap 206 may be positioned over cover panel 104 and tightened against cover panel 104, causing cover panel 104, gasket 416, and recessed surface 406 of frame panel 112 to form a seal against moisture. The result of completing the assembly is shown in FIG. 11.

FIGS. 12A through 14B are front top isometric view of electrical box 100, with shielding cap 102 being attached to cover panel 104 in three different orientations. During the attachment, two slots 510 (ones that diametrically face each other) in walls 508 may receive two fins 602-1 and 602-2 of shielding cap 102.

Figure 12A:
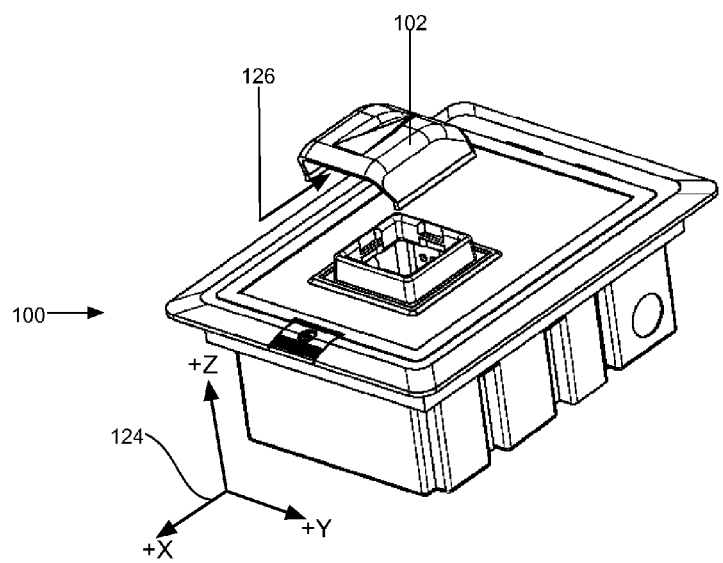
FIGS. 12A through 14B are front top isometric views of the electrical box of FIG. 2 with the shielding cap in different orientations.
Figure 12B:
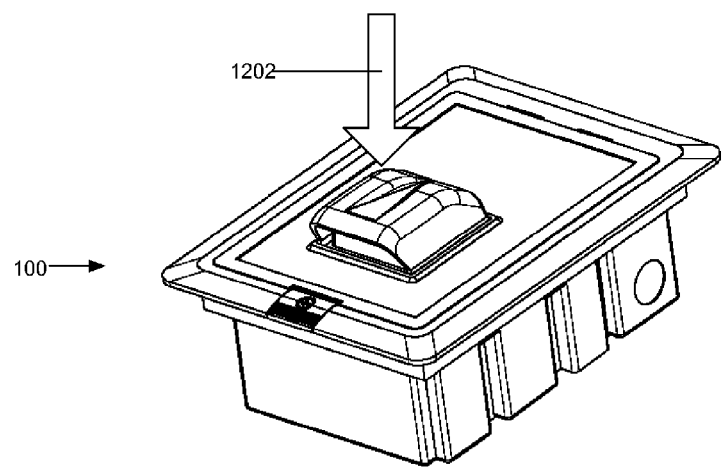
Figure 13A:
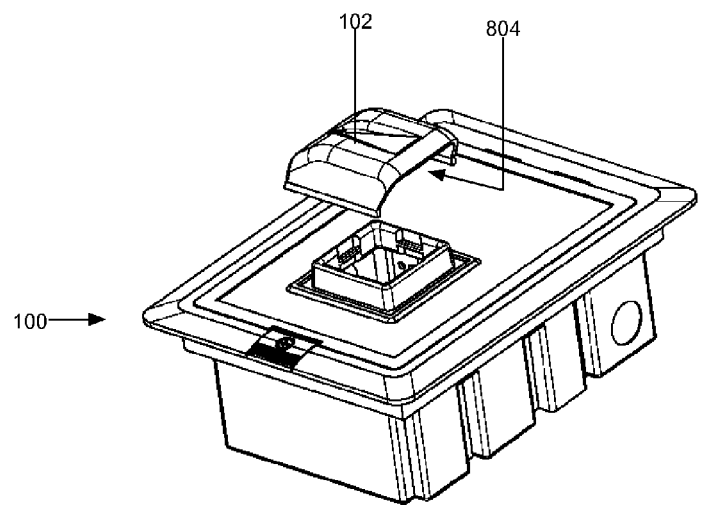
Figure 13B:
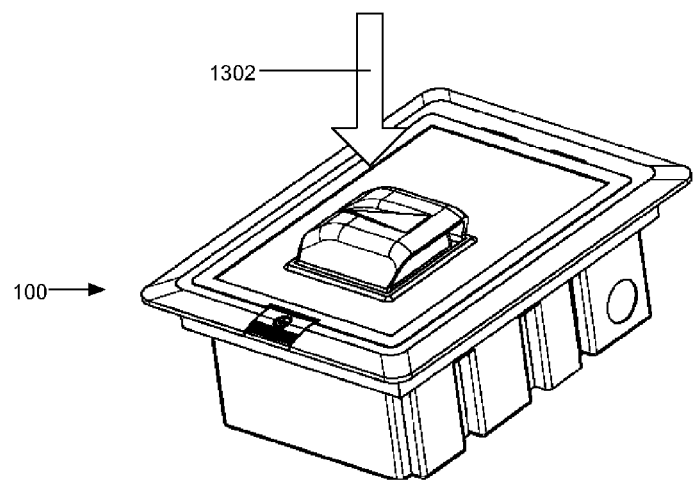
Figure 14A:
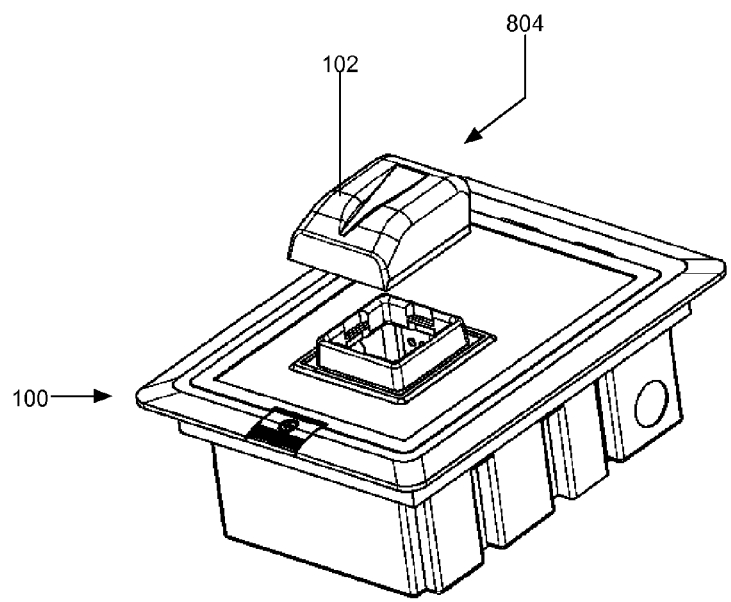
Figure 14B:
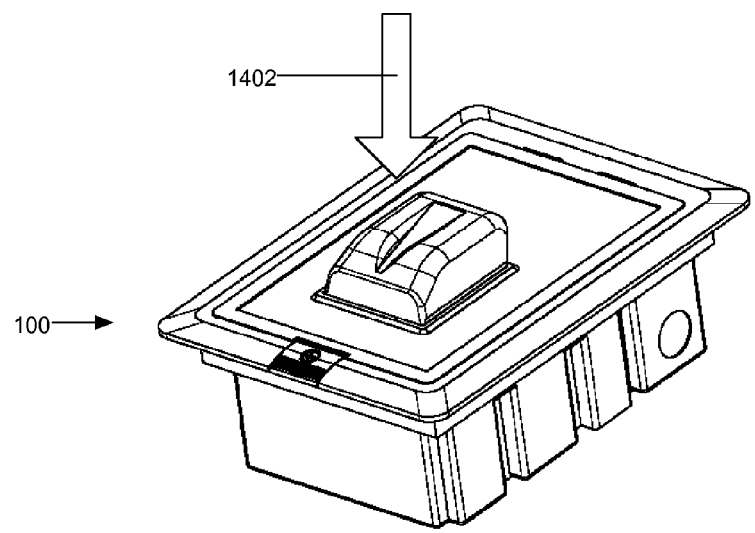

In FIG. 12A, open side 126 of shielding cap 102 is aligned with the −x-axis of xyz-axis 124. That is, open side 126 faces the front side of electrical box 100. FIG. 12B shows the configuration of electrical box 100 when shielding cap 102 having the orientation illustrated in FIG. 12A is fitted on cover panel 104. Similarly, in FIGS. 13A and 14A, open side 126 of shielding cap 102 is aligned with +y and −x directions, respectively. In addition, FIGS. 13B and 14B show the configurations of electrical box 100 when shielding cap 102 is fitted on cover panel 104 in the directions illustrated in FIGS. 13A and 14A, respectively. Although not shown, it is also possible to attach shielding cap 102 with open side 126 facing −y direction.

As shown, shielding cap 102 can be fitted on cover panel 104 such that open side 126 can face toward any of the four sides of electrical box 100 (e.g., front, back, front side, and back side). This may be useful, for example, after mounting electrical box 100, in orienting shielding cap 102 to minimize the exposure of open side 126 to elements, water, etc. More specifically, for example, assume that electrical box 100 is mounted in a horizontal position, with the front side of electrical box 100 facing a cabinet that shields electrical box 100 from water or cleaning fluid. In such a case, open side 126 may be oriented to face the cabinet. In another example, assume that electrical box 100 is mounted on a vertical beam. That is, cover panel 104 in an assembled configuration would be perpendicular to the horizontal plane. In such a case, shielding cap 102 may be oriented such that open side 126 faces the ground, to prevent water or any other element from entering electrical box 100.

Figure 15:
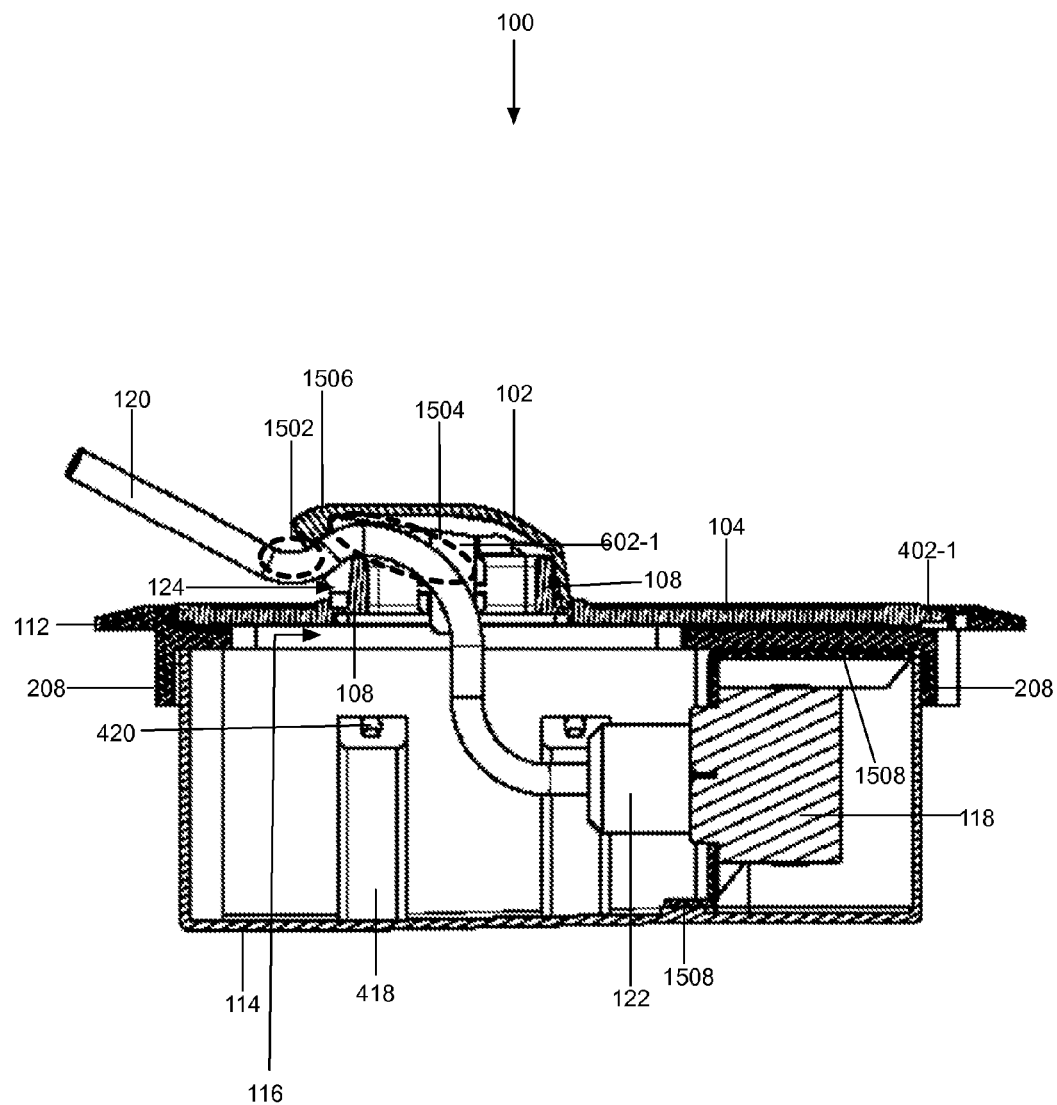
FIG. 15 is a cross-sectional side view of the electrical box of FIG. 2 in the configuration illustrated in FIG. 11.

FIG. 15 is a cross-sectional side view of electrical box 100. The cross section is taken from the plane that includes line AB of FIG. 11 and is parallel to the xz-plane of xyz-axis 124. FIG. 15 also illustrates functionalities of electrical box 100.

As shown, electrical cable/cord 120 enters electrical box 100 via open side 126, opening 110, and then opening 116, into the enclosed volume of body 114. Because the lowest point of the front top 1506 of shielding cap 102 dips, in relation to the top of shielding cap 102 and well wall 108, electrical cord/cable 120 makes a first bend 1502 and a second bend 1504 to reach opening 116.

Because portions of electrical cable/cord 120 are outside electrical box 100, it is possible for moisture that collects on those portions of electrical cable 120 to flow or creep along its length, until the moisture reaches first bend 1502. First bend 1502 is the locally lowest point of electrical cord/cable 120, and therefore, any moisture that traverses the length of cord 120 drips onto cover panel 104 at bend 1502, and does not enter electrical box 104. In some instances, it is possible for water, cleaning fluid, etc., to reach open side 126 of electrical box 100. However, well wall 108 may prevent substantial amount of such substance from entering electrical box 100.

As discussed above, in some embodiments (e.g., embodiments in which electrical box is to b mounted on a deck floor), electrical box 100 may include a number of holes that are strategically disposed about body 114 of housing 106. The holes may be positioned such that, should any water collect within electrical box 100, the accumulation may escape from box 100 through one or more of the holes. This may prevent the water from damaging electrical devices or components contained therein, such as electrical outlet 118.

FIG. 15 also illustrates a retaining component 1508 to which electrical outlet/receptacles 118 may be mounted or attached. Retaining component 1508 may then be attached to body 114 of housing 106.

Figure 16:
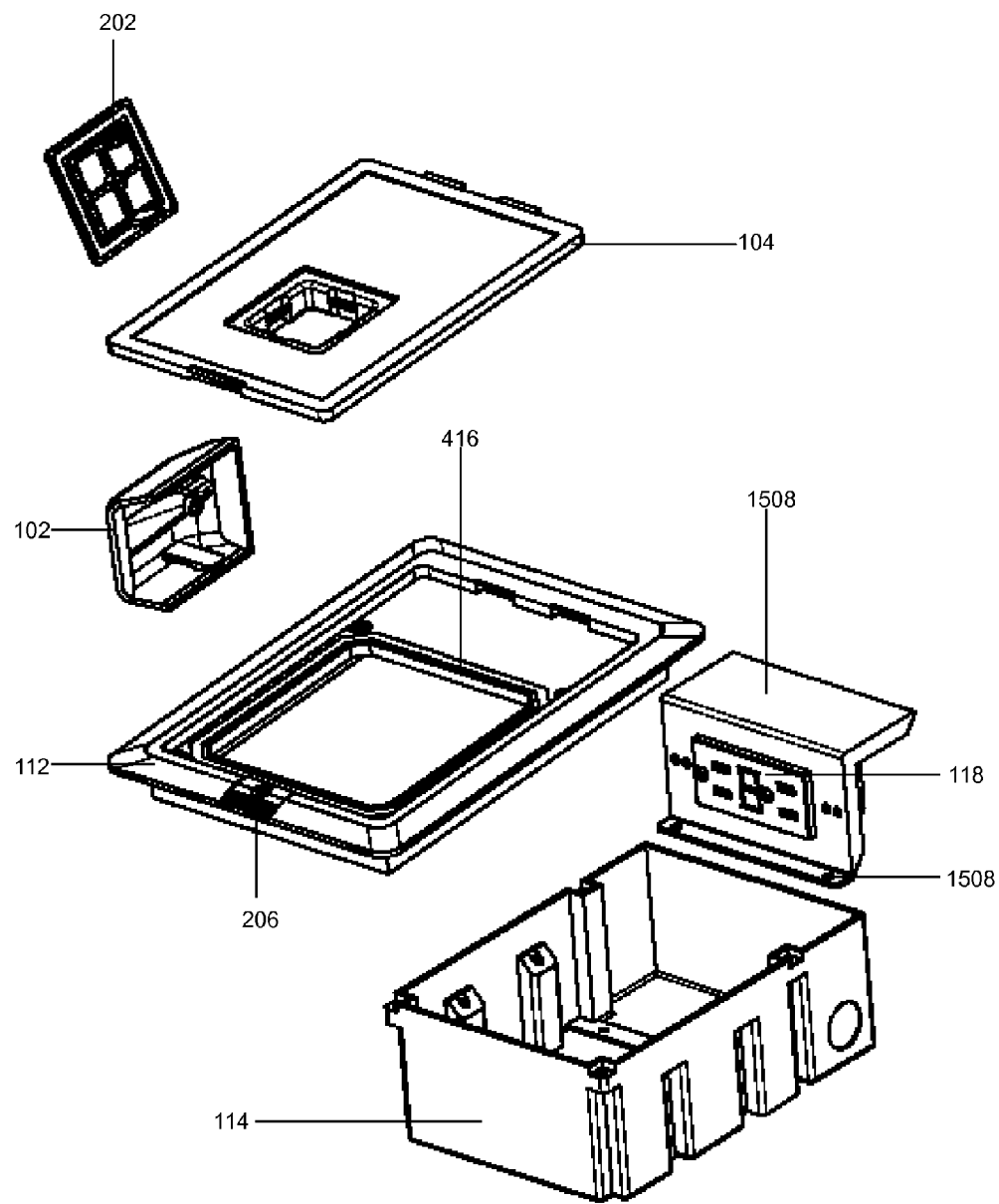
FIG. 16 is an isometric view of different components of the electrical box of FIG. 2.

FIG. 16 is an isometric view of the components of electrical box 100. FIG. 16 shows top door 202, cover panel 104, and shielding cap 102. In addition, FIG. 16 illustrates components of body 114 in unassembled configuration. As shown body 114 includes frame panel 112, body 114, and retaining component 1508, with electrical outlet/receptacle 118.

Figure 17:
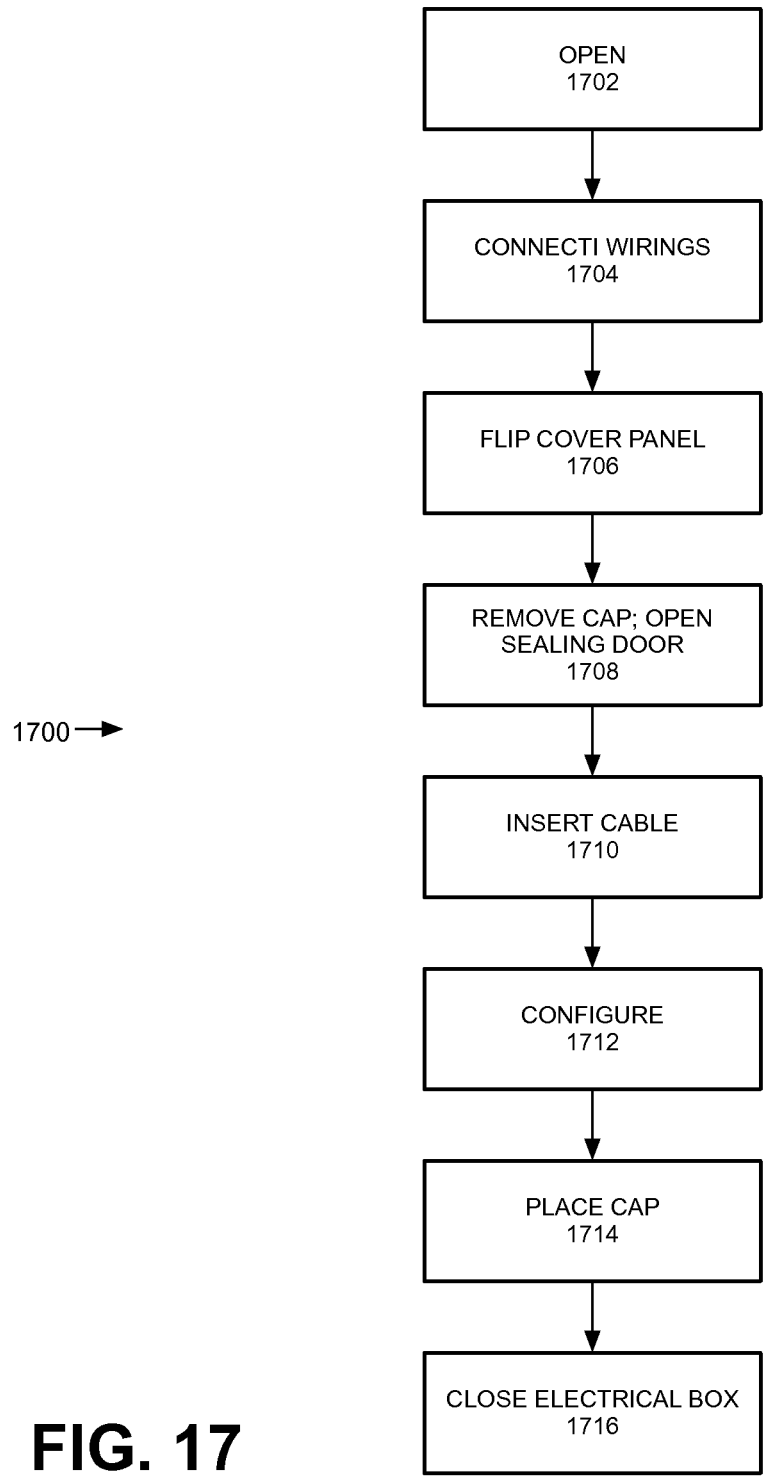
FIG. 17 is a flow diagram of an exemplary process for weatherproofing electrical devices.

FIG. 17 is a flow diagram of exemplary processing for weatherproofing electrical components/devices. Assume that electrical box 100 is ready to be attached to an external structure and that an electrical cable extends from a power source to the location at which electrical box 100 is to be mounted. As shown, process 1700 may begin with a user opening electrical box 100 (block 1702). Opening electrical box 100 may include, for example, loosening the screw on flap 206 holding cover panel 104 fitted in space 400, and removing cover panel 104 from space 400.

The user may connect any wirings (block 1704). For example, the user may connect wires that run from another location to electrical box 100 via hole 214, and configure the wires within devices/components in electrical box 100. Connecting the wirings may include, for example, attaching the components/devices to electrical box 100.

The user may flip over cover panel 104, such that shielding cap 102 is facing up (e.g., +z direction) and sealing door 202 is facing down (block 1706). In addition, the user may remove shielding cap 102 from cover panel 104 and detach or pop open sealing door 202 (in downward direction) (block 1708). As explained above, in one embodiment, shielding cap 102 and sealing door 202 may be attached to one another via a cord, wire, spring, etc., that runs from shielding cap 102 to sealing door 202 via opening 110. The attachment may prevent sealing door 202 from being misplaced or lost once it is removed from opening 110.

The user may insert electrical cable 120 through opening 110 surrounded by well wall 108 of cover panel 104 into electrical box 100 (block 1710). In addition, the user may configure electrical cable 120 (block 1712). For example, the user may insert electrical plug 122 into electrical outlet/receptacle 118.

The user may place or attach shielding cap 102 onto cover panel 104 (block 1714). For example, shielding cap 102 may be secured onto cover panel 104 by inserting/locking fins 602-1 and 602-2 into slots 510. As shown in FIG. 15, when shielding cap 102 is properly placed on cover panel 104, portions of cable 120 may form two bends 1502 and 1504, by the opposing forces exerted by the underside of shielding cap 102 and the top of well wall 108. As discussed above, the lower bend 1502 ensures that any water migrating from the outside toward open side 126 along cable 120 falls from cable 120 at bend 1502 (i.e., the lowest local point of electrical cable 120 entering open side 126 of shielding cap 102) due to gravity. In addition, as also discussed above with respect to FIGS. 12A through 14B, the user may select one of four possible orientations for shielding cap 102.

The user may close electrical box 100 (block 1716). Closing electrical box 100 may include inserting tabs 402-1 and 402-2 of cover panel 104 into slots 410-1 and 410-2, such that the side with shielding cap 102 (which may be fitted on cover panel 104) faces +z-direction. Next, cover panel 104 may be dropped onto recessed surface 406, filling panel space 400. Once cover panel 104 is fills panel space 400, flap 206 may be positioned to partially overlays cover panel 104, and the screw on flap 206 may be tightened. Accordingly, flap 206 may exert pressure on cover panel 104, such that cover panel 104, frame panel 112 and gasket 416 positioned there between form a moisture-proof seal.

Once installed, electrical box 100 may protect electrical components/devices within electrical box 100 from water and/or other types of fluids. As discussed above, well walls 108 prevent dirt, water, and/or other elements from entering electrical box 100. Furthermore, any water that may migrate toward electrical box 100 from the external environment is dropped at bend 1502 formed on electrical cable 120 connecting to components/devices in electrical box 100. In some implementations, any water that does collect in electrical box 100 is allowed to escape, preventing the water from accumulating and damaging the electrical components/devices in electrical box 100.

When electrical box 100 is not in use, electrical box 100 may be configured as shown in FIG. 2. That is, cover panel 104 may be removed from frame panel 112, and shielding cap 102 detached from cover panel 112. Cover panel 104 may be flipped and fitted onto frame panel 112, with sealing door 202 covering opening 110. In this configuration, sealing door 202 prevents water or other fluid from entering electrical box 100. Accordingly, a user may, for example, mop over electrical box 100 along with other portions of the structure (e.g., floor) to which electrical box 100 is attached.

In one embodiment, electrical box 100 may serve as an outlet box and enclose one or more devices, such as female electrical outlets or other electrical receptacles, and any associated electrical wiring or circuitry. Depending on the implementation, electrical box 100 may include fewer, additional, or different devices or components than those illustrated in the figures (for example, a networking port, telephone jack, television cable connection, fiber optic connections, and wiring or circuitry, etc). In addition, although electrical box 100 can be associated with various electrical functions (e.g., a switch box, a gang box, etc.), for the purpose of simplicity and ease in understanding, as well as to illustrate one embodiment of the invention, electrical box 100 is described in terms of an electrical outlet box.

The foregoing description of implementations provides illustration, but is not intended to be exhaustive or to limit the implementations to the precise form disclosed. Modifications and variations are possible in light of the above teachings or may be acquired from practice of the teachings. For example, dimensions of the elements are provided for ease of understanding, but different implementations for different applications may have different dimensions.

In addition, while series of steps have been described with regard to exemplary processes illustrated in FIG. 17, the order of the steps may be modified in other implementations. In addition, non-dependent steps may represent features that can be performed at other points in the process, such as in parallel to other steps.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. An electrical box, comprising:
a housing enclosing a space and including an inner opening to the enclosed space; and
a cover panel over the inner opening, the cover panel including:
a wall projecting from one side of the cover panel, the wall surrounding a panel opening in the cover panel,
a shielding cap, having an open side therein, to be placed over the wall and coupled to the one side of the cover panel when the electrical box is in a first configuration, and
a sealing door to block the panel opening at the other side of the cover panel when the electrical box is in a second configuration,
wherein the cover panel is configured to:
cover the housing, the one side of the cover panel facing outside of the electrical box when the electrical box is in the first configuration; and
cover the housing, the other side of the cover panel facing the outside of the electrical box when the electrical box is in the second configuration.

2. The electrical box of claim 1, wherein the shielding cap is configured to allow a cable passing from the outside of the electrical box through the panel opening surrounded by the wall on the one side of the cover panel and through the inner opening into the enclosed space of the housing when the electrical box is in the first configuration.

3. The electrical box of claim 2, wherein the shielding cap and the cover panel are configured to bend a cable, at first and second segments of the cable, that extends from the outside of the electrical box to the enclosed space of the housing via the panel opening and the inner opening, the first segment including a first bend and the second segment including a second bend.

4. The electrical box of claim 3, wherein when the electrical box is in substantially horizontal position, the first bend includes a locally lowest point of the cable, and the second bend includes a point higher than the locally lowest point, and
wherein water that migrates along the cable toward the electrical box from an exterior of the electrical box falls from the locally lowest point due to gravity and does not enter the electrical box.

5. The electrical box of claim 4, wherein the cable includes an end connected to an electrical connector and wherein the housing includes, in the enclosed space, the electrical connector.

6. The electrical box of claim 3, wherein the shielding cap includes a portion that engages the wall, the open side of the shielding cap in a direction toward one of:
a front of the electrical box;
a back of the electrical box; or
one of sides of the electrical box.

7. The electrical box of claim 1, wherein the shielding cap is further configured to:
dislodge the sealing door from blocking the panel opening and open a passageway into the enclosed space when the shielding cap is coupled to the one side of the cover panel.

8. The electrical box of claim 7, further comprising:
a wire, cord, string, spring, or cable that couples the shielding cap, through the panel opening and the inner opening, to the sealing door.

9. The electrical box of claim 7, wherein the sealing door is configured to prevent water or another substance from entering the electrical box through the panel opening.

10. The electrical box of claim 1, wherein the housing includes a plurality of sides, one of the sides including a support panel and other sides including a body of the housing,
wherein the support panel includes the inner opening to the enclosed space and a recessed surface that is parallel to a top of the support panel,
wherein the cover panel and the support panel are configured to:
form a moisture-proof seal when the one or the other side of the cover panel is placed flat against the recessed surface of the support panel, and
provide clearance for passage of a cable into the enclosed space through the panel opening and the inner opening when the one or the other side of the cover panel is placed flat against the recessed surface of the support panel.

11. The electrical box of claim 10, wherein the support panel includes a flap, when in position, applies pressure on the cover panel and the support panel to form the moisture-proof seal.

12. The electrical box of claim 1, wherein the housing includes holes through which water can escape from the electrical box.

13. The electrical box of claim 1, wherein the housing includes at least one of:
- an electrical outlet;
- a communication device; or
- a switch.

14. The electrical box of claim 1, wherein the wall includes an internal surface forming a channel into the panel opening, the internal surface including a slot perpendicular to the one side of the cover panel, the slot configured to engage a portion of the shielding cap when the shielding cap is placed over the wall and coupled to the one side of the cover panel.

15. An electrical box comprising:
- a panel coupled to a top side of the electrical box, the panel including:
    - a wall on one side of the panel, the wall surrounding a well, in the first panel, into a space in the electrical box; and
    - a cap to be placed over the wall and the well,
- wherein the cap and the well are configured to form a first bend and a second bend on a cable that extends from outside of the electrical box to an inside space of the electrical box, the first bend including a locally lowest point on cable portions that are outside of an area under the cap.

16. The electrical box of claim 15, wherein the panel includes a door, configured to seal the well at the other side of the panel when the panel is reassembled to the electrical box such that the other side of the panel faces the outside of the electrical box.

17. The electrical box of claim 16, wherein the electrical box includes a wire, cord, string, spring, or cable that couples the cap to the door.

18. The electrical box of claim 15, wherein the panel includes a gasket,
- wherein the panel is configured form a moisture-proof seal via the gasket when the panel is coupled to the electrical box.

19. The electrical box of claim 15, wherein the electrical box includes a flap,
- wherein the flap is configured to apply pressure on the one side of the panel to press the other side of the panel against the electrical box.

20. A method, comprising:
- opening a cover panel of an electrical box, the cover panel having one side with an opening surrounded by a wall projecting from the cover panel;
- inserting a cable through the opening into an enclosed space of the electrical box;
- placing the cover panel over the electrical box such that the one side faces outside of the electrical box, and
- placing a shielding cap over the wall to attach the shielding cap to the one side of the cover panel, wherein the placing the shielding cap comprises:
    - pressing the shielding cap to drive a bottom edge of the shielding cap, against a first segment of the cable toward the one side of the cover panel, forming a first bend on the first segment, and
    - pressing the shielding cap to push a second segment of the cable against a top of the wall, forming a second bend on the second segment; and
- wherein the second segment of the cable connects to a cable portion in the enclosed space of the electrical box.

* * * * *